July 27, 1948.  C. J. JOHNSON ET AL  2,446,011
HYDRAULIC MOTOR WITH PISTOL GRIP HANDLE
AND TRIGGER ACTUATED VALVE
Filed Aug. 6, 1945  2 Sheets-Sheet 1
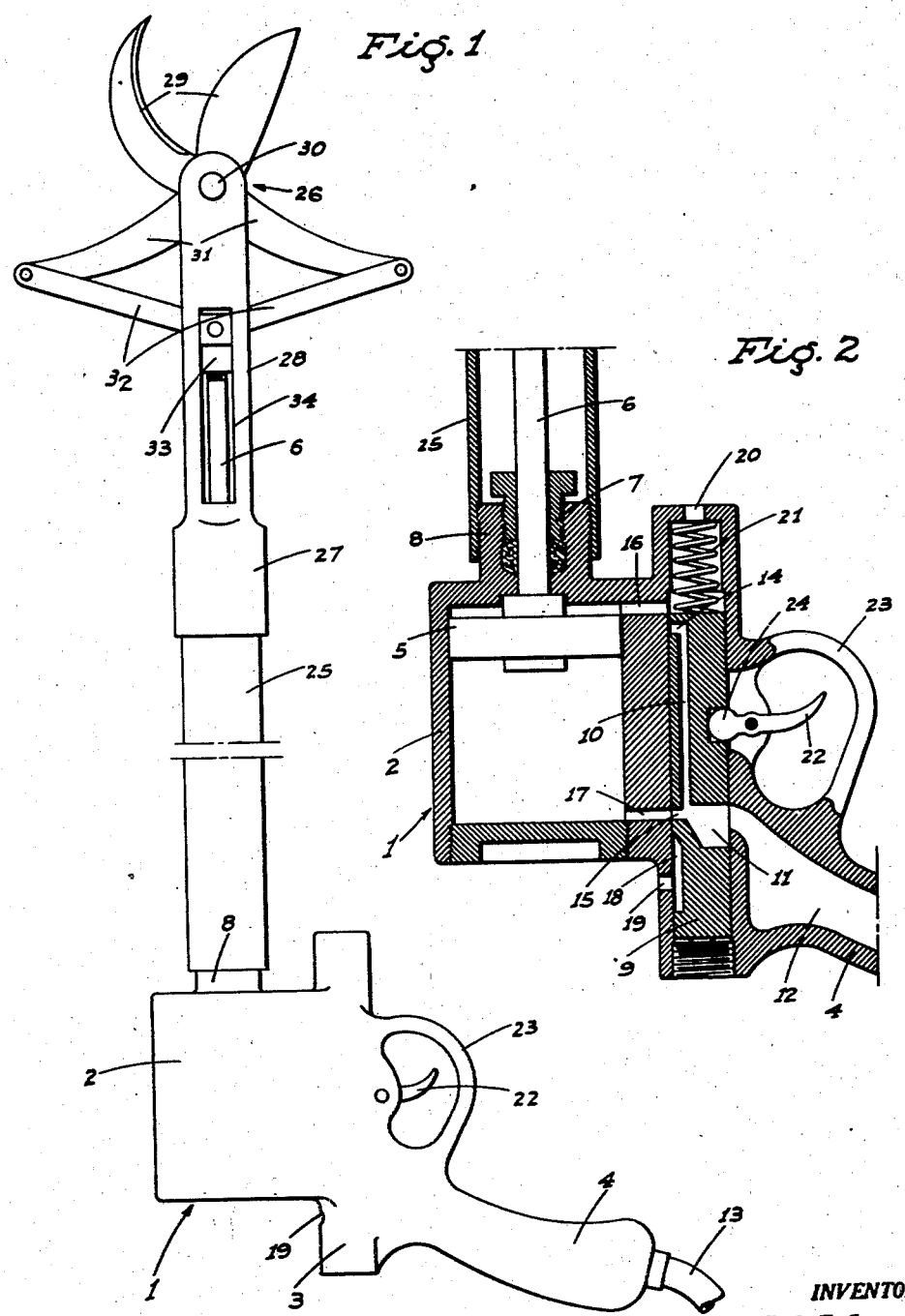
INVENTORS
C. J. Johnson
F. E. King
BY
ATTYS July 27, 1948.                C. J. JOHNSON ET AL                2,446,011
              HYDRAULIC MOTOR WITH PISTOL GRIP HANDLE
                     AND TRIGGER ACTUATED VALVE
Filed Aug. 6, 1945                                     2 Sheets-Sheet 2

INVENTORS
C.J.Johnson
F.E.King
BY
ATTYS

Patented July 27, 1948

2,446,011

UNITED STATES PATENT OFFICE 2,446,011

HYDRAULIC MOTOR WITH PISTOL GRIP HANDLE AND TRIGGER ACTUATED VALVE

Charles J. Johnson, Sacramento, and Frank E. King, Woodland, Calif.

Application August 6, 1945, Serial No. 609,288

1 Claim. (Cl. 121—3)

This invention relates generally to an improved pruning device for use in orchards, vineyards, gardens, and the like.

In particular this invention is directed to, and it is an object to provide, a novel power actuated pruning device adapted to be hand supported by means of a pistol type grip.

Another object of this invention is to provide a pruning device, as above, which includes a fluid pressure actuated power cylinder, and a pruning unit which includes a member adapted to be reciprocated and to which member said cylinder is connected in operative relation. The pruning unit comprises, in different embodiments, pruning shears and a saw.

A further object of the invention is to provide a pruning device, as in the preceding paragraph, in which the power cylinder is controlled through the medium of a reversing valve; said valve being manually controlled in the embodiment which incorporates the pruning shears, whereby a single reciprocation of the cylinder piston can be obtained so that the shears then are actuated once only. In the embodiment including a saw, the valve is automatically controlled or reversed whereby the reciprocation of the cylinder piston, and consequently the saw, is continuous during use of the device.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views:

Figure 1 is an elevation of the embodiment of the pruning device which includes a pruning shear unit.

Figure 2 is a fragmentary sectional elevation of the device shown in Fig. 1, illustrating particularly the valve controlled power cylinder arrangement.

Figure 3:
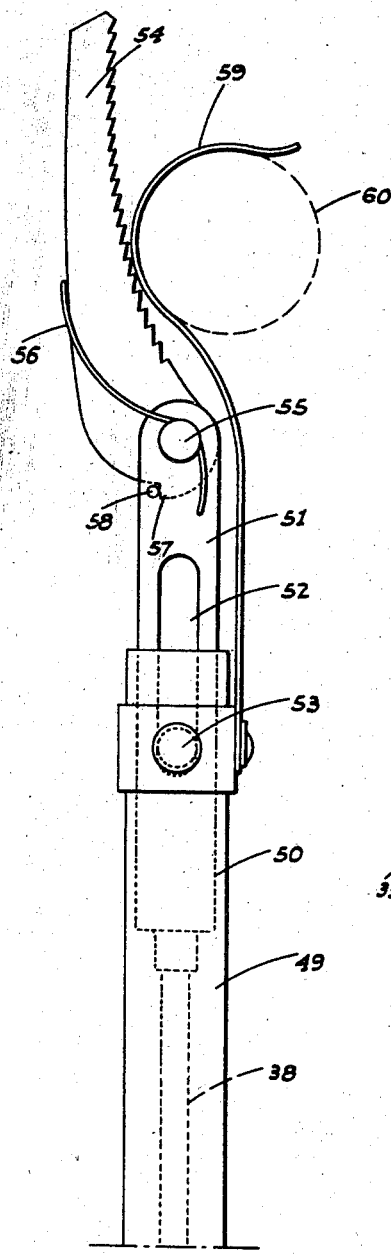
Figure 3 is a fragmentary elevation of the pruning unit of the embodiment of the device which includes a saw.

Referring now more particularly to the characters of reference on the drawings, and particularly at present to the embodiments of Figs. 1 and 2, the device comprises a hand-supported power unit, indicated generally at 1, and which power unit includes a relatively short cylinder 2 formed along the bottom with a hollow valve body 3; there being a hand grip 4 depending from the valve body 3 adjacent the rear end of the latter.

A piston 5 is disposed in the cylinder 2 and is secured on the inner end of a forwardly projecting piston or connecting rod 6 which extends through a packing 7 in an axial boss 8 on the front of said cylinder 2.

A slide valve 9 is disposed in the hollow valve body 3, and said slide valve includes a longitudinal passage 10 therein; said passage having an enlarged port 11 at its rear end and opening downwardly, said port 11 being of sufficient extent to register at all times with a fluid pressure feed passage 12 formed in the hand grip 4. Fluid pressure, such as air under pressure, is fed to the passage 12 by a hose 13 connected to the lower end of the grip 4.

The slide valve 9 includes, in communication with the passage 10 and at opposite ends thereof, a pair of upwardly opening ports 14 and 15 adapted to register with ports 16 and 17 leading into the cylinder 2. The ports 14 and 15 are spaced apart, lengthwise of the slide valve 9, a distance less than the ports 16 and 17 whereby when the ports 14 and 16 are in register, the ports 15 and 17 are out of register, and vice versa. When the ports 14 and 16 are in register fluid from the opposite side of the cylinder bleeds out of the latter through a relief passage 18 in valve 9, which then communicates between port 17 and a vent hole 19 in the valve body. Conversely, when the ports 15 and 17 are in register the fluid from the opposite side of the cylinder bleeds out through the port 16 into the valve body 3 and thence out of a vent hole 20 in the forward end of said body. This provides a reversing valve arrangement, and by means of which fluid pressure may be introduced alternately into the cylinder 2 on opposite sides of the piston 5, so as to cause reciprocation of the latter.

The slide valve 9 is normally maintained in retracted position, with the ports 15 and 17 in register, by means of a compression spring 21 seated in the valve body 3 between its forward end and the adjacent end of said slide valve. Ahead of the grip 4 the device includes a pivoted trigger 22 disposed within a trigger guard 23; the upper end of said trigger being enlarged, as at 24, and riding in a notch in the bottom of the slide valve 9. It will be seen that upon pulling of the trigger 22 the slide valve 9 is advanced, whereupon the fluid pressure causes retraction of the piston 5, but when the trigger is released the slide valve returns to its normal retracted position, and the piston consequently is retracted. It is thus necessary that the trigger be pulled and released once for each reciprocation of the piston 5.

An elongated tubular shank 25 is fixed in connection with the boss 8 and projects forwardly therefrom in surrounding relation to the connecting rod 6. At its forward end the tubular shank 25 supports a pruning unit, indicated generally at 26, and which pruning unit is actuated by the connecting rod 6, said pruning unit comprising the following:

A collar 27 is fixed on the forward end of the tubular shank 25, and includes a pair of spaced, parallel forwardly projecting legs 28, between the outer ends of which a pair of intersecting pruning shear blades 29 are pivoted, as at 30. The blades 29 include rearwardly diverging blade shanks 31, and pivotally connected links 32 extend in inwardly converging relation from the outer ends of the blade shanks 31 to a slide 33 carried between the legs 28 and riding in matching slots 34 therein. The forward end of the connecting rod 6 is attached to the slide 33.

The blades 29 are normally open, and at which time the piston 5 is advanced. With each reciprocation of the piston 5, under the control of the trigger 22, as hereinbefore explained, the blades 29 close and then open, producing an effective and powerful pruning action.

As the entire device is hand supported, and readily controlled by a finger of the operator on the trigger 22, such device is convenient and easy to use.

Figure 4:
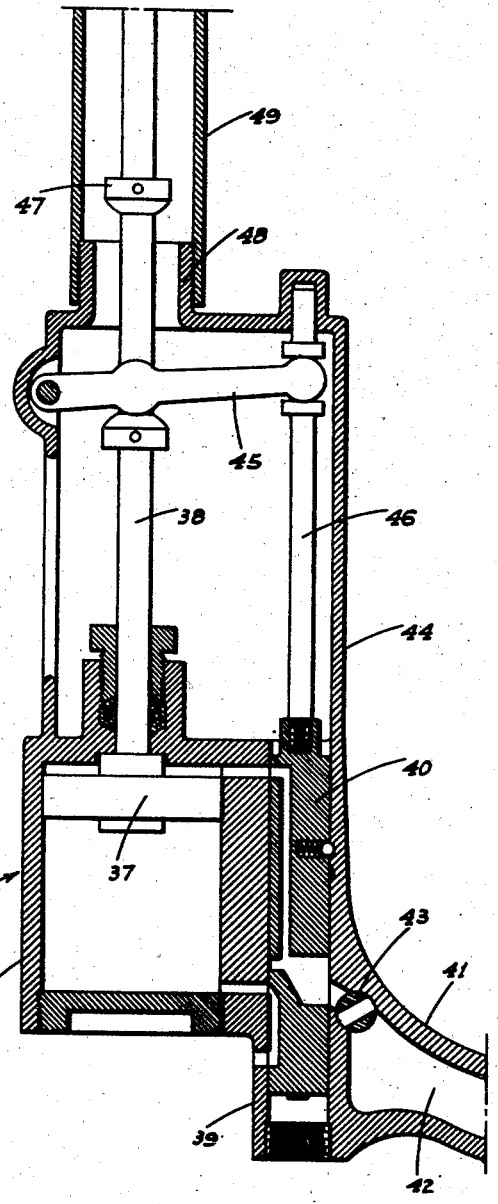
Figure 4 is a fragmentary sectional elevation of the embodiment which includes a saw, and illustrates particularly the valve controlled power cylinder arrangement therefor.

In the embodiment of Figs. 3 and 4 the hand-supported power unit 35 is similar to the power unit 1 of Figs. 1 and 2, and includes a cylinder 36, a piston 37, a connecting rod 38, a hollow valve body 39 and a slide valve 40 in said body 39 arranged in reversing relation to the piston 37. In this embodiment the power unit also includes a depending hand grip 41 through which the fluid pressure is supplied to the valve, but here no trigger is employed and the valve 40 is reversed or reciprocated automatically, as will hereinafter appear. However, the supply of fluid pressure from the passage 42 to the valve is adapted to be turned on or off by means of a manual valve 43 in the grip passage 42.

The valve 40 is automatically reciprocated or reversed, in opposition to the piston 37, whereby to cause constant reciprocation of the latter when the valve 43 is open, by means of the following reversing mechanism:

The cylinder 36 is formed with a forwardly projecting housing 44 which surrounds a portion of the connecting rod 38. A transversely extending valve shifting lever 45 is pivoted in the housing 44 in intersecting relation to the connecting rod 38 and for swinging movement lengthwise of the device. At its free end the lever 45 is pivoted with a longitudinally extending slide rod 46 which is attached, at its rear end, to the adjacent end of the slide valve 40. Collars 47 on the connecting rod 38 on opposite sides of the valve shifting lever 45 engage and shift said lever at opposite ends of the stroke of the piston 37. By reason of this arrangement it will be seen that when the piston 37 reaches an advanced point, the lever 45 is engaged by the rearmost one of the collars 47 and swung to a position to cause advance of the slide valve 40, whereupon the piston 37 reverses or moves to retracted position, at which time the other collar strikes and reverses the valve shifting lever 45. Consequently the valve 40 is shifted back and forth alternately in opposition to movement of the piston, and the latter continues to reciprocate as long as the valve 43 is open.

At its forward end, and concentric to the connecting rod 38, the housing 44 includes a boss 48 to which a tubular and forwardly projecting shank 49 is fixed. At its forward end the shank 49 has a plunger 50 therein, and to which plunger the forward end of the connecting rod 38 is attached. The plunger 50 includes a pair of forwardly projecting, transversely spaced but parallel legs 51 slotted lengthwise, as at 52, and through which slots a shank supported cross or guide pin 53 engages.

A saw blade 54 is pivoted at its rear end between the forward portions of the legs 51 on a cross pin 55, and said saw blade is normally urged in a clockwise direction by a spring 56; there being a stop shoulder 57 on the rear end of the blade 54 adapted to engage a stop pin 58 extending between the legs 51, whereby to limit rotation of said blade by the spring 56.

On one or both sides of the saw blade 54, the device includes a limb engaging hook 59 which extends forwardly from connection with the front end of the tubular shank 49.

In use of this embodiment of the invention, the hook 59 is engaged over a limb 60 and the valve 43 when opened. This results in continuing reciprocation of the piston 37, and the saw blade 54, whereby said blade—by proper manipulation of the grip 41—effectively and quickly cuts through the limb 60.

From the foregoing description it will be readily seen that there has been produced such a device as substantially fulfills the objects of the inventions as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent is desired:

A hydraulic motor and valve mechanism for the purpose described comprising a hollow pistol grip handle, means for connecting a source of fluid supply to the interior of the handle, a trigger pivoted on the handle and having a finger grip at one end within reach of a finger on a hand gripping the handle, the other end of the trigger being in the form of a rounded head, a valve sleeve formed on the handle and lying transversely of the longitudinal axis of the handle, a slide valve disposed in the sleeve, such valve being provided with a notch in its circumference, the rounded head of the trigger fitting in the notch, a spring interposed between one end of the valve and the adjacent end of the sleeve and acting to normally hold the valve against the opposite end of the sleeve, the trigger being operable to slide the valve against the resistance of the spring, a cylinder mounted on the sleeve substantially parallel therewith, such cylinder being provided with a port at each end, a piston mounted in the cylinder for reciprocating movement between said ports, the valve being provided with spaced ports, each valve port being positioned to be alternately carried into and out of register with one of the cylinder ports as the valve is reciprocated through the functioning of the trigger and spring, means placing both of the valve ports in communication with the interior of the handle, and means for venting the cylinder ports to the atmosphere.

CHARLES J. JOHNSON.
FRANK E. KING.

REFERENCES CITED

The following references are of record in the file of this patent:

UNITED STATES PATENTS

| Number | Name | Date |
| --- | --- | --- |
| 739,496 | Kidder | Sept. 22, 1903 |
| 984,112 | Schumacher | Feb. 14, 1911 |
| 1,331,353 | Nurnberger | Feb. 17, 1920 |
| 1,733,374 | Kalgren | Oct. 29, 1929 |
| 1,825,290 | Stevens | Sept. 29, 1931 |
| 2,100,092 | Tear | Nov. 23, 1937 |
| 2,104,468 | Osborn | Jan. 4, 1938 |
| 2,171,029 | Geldhof | Aug. 29, 1939 |
| 2,366,909 | Johnson | Jan. 9, 1945 |